United States Patent
Zhao et al.

(10) Patent No.: US 11,973,370 B2
(45) Date of Patent: Apr. 30, 2024

(54) MOTOR, COMPRESSOR AND REFRIGERATION DEVICE

(71) Applicant: ANHUI MEIZHI PRECISION MANUFACTURING CO., LTD., Anhui (CN)

(72) Inventors: Dongliang Zhao, Anhui (CN); Zhengjun Sun, Anhui (CN); Xiaohua Qiu, Anhui (CN)

(73) Assignee: ANHUI MEIZHI PRECISION MANUFACTURING CO., LTD., Anhui (CN)

( * ) Notice: Subject to any disclaimer, the term of this patent is extended or adjusted under 35 U.S.C. 154(b) by 169 days.

(21) Appl. No.: 17/825,283

(22) Filed: May 26, 2022

(65) Prior Publication Data
US 2022/0294285 A1    Sep. 15, 2022

Related U.S. Application Data (63) Continuation of application No. PCT/CN2021/120605, filed on Sep. 26, 2021.

(30) Foreign Application Priority Data

Mar. 15, 2021 (CN) .......................... 202120538600.9

(51) Int. Cl.
*H02K 1/16* (2006.01)
*H02K 1/26* (2006.01)
*H02K 7/14* (2006.01)

(52) U.S. Cl.
CPC ............. *H02K 1/165* (2013.01); *H02K 1/265* (2013.01); *H02K 7/14* (2013.01); *H02K 2213/03* (2013.01)

(58) Field of Classification Search
CPC .......... H02K 1/16; H02K 1/165; H02K 1/265; H02K 7/14; H02K 2213/03
(Continued)

(56) References Cited

U.S. PATENT DOCUMENTS

2010/0247347 A1* 9/2010 Yoshino ................. H02K 17/18
  310/212
2010/0253174 A1* 10/2010 Yabe ..................... H02K 17/20
  310/212
(Continued)

FOREIGN PATENT DOCUMENTS

CN       207968099 U    10/2018
CN       208353103 U     1/2019
(Continued)

OTHER PUBLICATIONS

International Search Report and Written Opinion dated Dec. 17, 2021 received in International Application No. PCT/CN2021/120605 together with an English language translation.

*Primary Examiner* — Rashad H Johnson
(74) *Attorney, Agent, or Firm* — Scully, Scott, Murphy & Presser, P.C.

(57) ABSTRACT

A motor, a compressor and a refrigeration device are provided. The motor includes a stator and a rotor. The stator has a central hole and multiple stator slots arranged in an annular array centered on an axis of the central hole. The rotor is provided in the central hole. Multiple rotor slots are provided on the rotor, and are arranged in an annular array centered on the axis of the central hole and close to an edge of the rotor. A plane perpendicular to the axis of the central hole is a reference plane, a sum of projected areas of the stator slots on the reference plane is S1, a sum of projected areas of the rotor slots on the reference plane is S2, an outer periphery of the stator projected on the reference plane
(Continued)

forms a projected pattern, and an area of the projected pattern is S3.

14 Claims, 5 Drawing Sheets

(58) Field of Classification Search
USPC .......................................... 310/179, 181, 184
See application file for complete search history.

(56) References Cited

U.S. PATENT DOCUMENTS

| | | | | |
|---|---|---|---|---|
| 2011/0081263 | A1* | 4/2011 | Yoshino | H02K 1/28 |
| | | | | 310/212 |
| 2011/0210692 | A1* | 9/2011 | Nishihama | H02K 17/165 |
| | | | | 310/211 |
| 2012/0091850 | A1* | 4/2012 | Sawahata | H02K 17/165 |
| | | | | 310/211 |
| 2013/0175896 | A1* | 7/2013 | Yabe | H02K 17/18 |
| | | | | 310/211 |
| 2013/0214635 | A1* | 8/2013 | Yabe | H02K 17/20 |
| | | | | 310/197 |
| 2017/0047802 | A1* | 2/2017 | Yabe | H02K 17/165 |
| 2018/0083502 | A1* | 3/2018 | Ishikawa | H02K 1/276 |
| 2018/0212482 | A1* | 7/2018 | Nigo | H02K 7/14 |
| 2018/0219438 | A1* | 8/2018 | Oikawa | H02K 1/2746 |
| 2018/0254689 | A1* | 9/2018 | Jain | H02K 21/14 |
| 2019/0006896 | A1* | 1/2019 | Baba | H02K 1/278 |
| 2019/0044400 | A1* | 2/2019 | Tsuchida | F04D 29/403 |
| 2019/0089215 | A1* | 3/2019 | Ishikawa | H02K 21/14 |
| 2020/0358327 | A1* | 11/2020 | Tsukamoto | H02K 3/02 |
| 2021/0028661 | A1* | 1/2021 | Shih | H02K 1/276 |
| 2021/0211003 | A1* | 7/2021 | Shimokawa | H02K 7/14 |
| 2021/0273507 | A1* | 9/2021 | Ishikawa | H02K 1/276 |
| 2021/0296950 | A1* | 9/2021 | Baba | H02K 21/16 |
| 2021/0408850 | A1* | 12/2021 | Watanabe | H02K 1/276 |
| 2022/0149682 | A1* | 5/2022 | Watanabe | H02K 1/2766 |
| 2022/0173644 | A1* | 6/2022 | Li | H02K 1/246 |
| 2022/0344987 | A1* | 10/2022 | Tanaka | H02K 29/03 |
| 2023/0006489 | A1* | 1/2023 | Watanabe | H02K 29/03 |
| 2023/0208223 | A1* | 6/2023 | Baba | F25B 31/026 |
| | | | | 310/156.56 |
| 2023/0231456 | A1* | 7/2023 | Masuko | H02K 3/18 |
| | | | | 417/410.1 |
| 2023/0243360 | A1* | 8/2023 | Shimokawa | F04D 25/0646 |
| | | | | 417/354 |

FOREIGN PATENT DOCUMENTS

| | | |
|---|---|---|
| CN | 214506683 U | 10/2021 |
| JP | 2003199269 A | 7/2003 |

* cited by examiner

MOTOR, COMPRESSOR AND REFRIGERATION DEVICE

CROSS-REFERENCE TO RELATED APPLICATIONS

This application is a continuation application of PCT International Application No. PCT/CN2021/120605, filed on Sep. 26, 2021, which claims priority to and benefits of Chinese Patent Application No. 202120538600.9, filed on Mar. 15, 2021, the entire contents of which are incorporated herein by reference for all purposes. No new matter has been introduced.

FIELD

The present disclosure relates to the field of motors, and in particular, to a motor, a compressor and a refrigeration device.

BACKGROUND

In the related art, typically the larger the rotor slot area of the motor is, the smaller the starting torque is. Thus, the efficiency of the motor can be improved. However, correspondingly, the larger the stator slot area is, the easier the magnetic density of the motor yoke or the teeth is to be saturated, resulting in unreasonable distribution of iron loss and copper loss in the stator, affecting the performance of the motor and reducing the efficiency of the motor.

SUMMARY

The main purpose of the present disclosure is to at least provide a motor, a compressor and a refrigeration device, aiming to at least improve the distribution of iron loss and copper loss of the motor.

In order to achieve the above objective, the present disclosure provides a motor.

The motor includes a stator and a rotor. The stator has a central hole and a plurality of stator slots. The stator slots are arranged in an annular array centered on an axis of the central hole. The rotor is provided in the central hole. A plurality of rotor slots are provided on the rotor. The rotor slots are arranged in an annular array centered on the axis of the central hole, and are close to an edge of the rotor. A plane perpendicular to the axis of the central hole is a reference plane, a sum of projected areas of the stator slots on the reference plane is S1, a sum of projected areas of the rotor slots on the reference plane is S2, an outer periphery of the stator projected on the reference plane forms a projected pattern, and an area of the projected pattern is S3, S2/S1 is not less than 0.26 and not greater than 0.33, and S1/S3 is not less than 0.10 and not less than 0.10 and not greater than 0.18.

In an embodiment, S2/S1 is not less than 0.27 and not greater than 0.31. In an embodiment, S2/S1 is equal to 0.285.

In an embodiment, S1/S3 is not less than 0.12 and not greater than 0.16. In an embodiment, S1/S3 is equal to 0.135.

In an embodiment, a diameter of the central hole is D1, an outer diameter of the stator is D2, and D1/D2 is not less than 0.51 and not greater than 0.53.

In an embodiment, an outer diameter of the rotor is D3, and (D1−D3)/2 is not greater than 0.50 mm.

In an embodiment, a number of the stator slots is a multiple of 6, and a number of the rotor slots is a multiple of 2.

In an embodiment, a number of the stator slots is 30, and a number of the rotor slots is 34.

In an embodiment, a periphery of the stator has a trimming portion that is trimmed.

In an embodiment, a number of the trimming portions is not less than four, and a plurality of trimming portions are arranged along a circumferential direction of the stator.

The present disclosure further provides a compressor, including a housing and a motor, the motor being installed in the housing. The stator has a central hole and a plurality of stator slots, the stator slots are arranged in an annular array centered on an axis of the central hole, the rotor is provided in the central hole, a plurality of rotor slots are provided on the rotor, the rotor slots are arranged in an annular array centered on the axis of the central hole, and are close to an edge of the rotor, a plane perpendicular to the axis of the central hole is a reference plane, a sum of projected areas of the stator slots on the reference plane is S1, a sum of projected areas of the rotor slots on the reference plane is S2, an outer periphery of the stator projected on the reference plane forms a projected pattern, and an area of the projected pattern is S3, S2/S1 is not less than 0.26 and not greater than 0.33, and S1/S3 is not less than 0.10 and not greater than 0.18.

The present disclosure further provides a refrigeration device, including a motor and/or a compressor. The compressor includes a housing and the motor described above. The motor is installed in the housing. The stator has a central hole and a plurality of stator slots, the stator slots are arranged in an annular array centered on an axis of the central hole, the rotor is provided in the central hole, a plurality of rotor slots are provided on the rotor, the rotor slots are arranged in an annular array centered on the axis of the central hole, and are close to an edge of the rotor, a plane perpendicular to the axis of the central hole is a reference plane, a sum of projected areas of the stator slots on the reference plane is S1, a sum of projected areas of the rotor slots on the reference plane is S2, an outer periphery of the stator projected on the reference plane forms a projected pattern, and an area of the projected pattern is S3, S2/S1 is not less than 0.26 and not greater than 0.33, and S1/S3 is not less than 0.10 and not greater than 0.18.

In technical solutions of the present disclosure, the sum S1 of the projected area of the stator slot on the reference plane ensures that the stator winding located in the stator slot can provide an effective armature magnetic field, thereby reducing the copper loss of the stator winding. In addition, by defining the sum S2 of the projected area of the rotor slot on the reference plane, the area of the rotor slot is reduced, and the iron loss of the rotor is reduced. The ratio of S2 to S1 is not less than 0.26 and not greater than 0.33, which effectively improves the distribution of iron loss and copper loss of the motor, improves the overall performance and efficiency of the motor, and balances the relationship between the starting torque of the motor and the motor efficiency.

Further, in order to improve the distribution of iron loss and copper loss of the motor, ensure that the stator winding can provide an effective armature magnetic field, the magnetic flux of the motor is limited, the ratio of the projected area S3 of the outer periphery of the stator projected on the reference plane to the sum S1 of the projected area of the stator slot on the reference plane is not less than 0.10 and not greater than 0.18, so that the motor efficiency can reach the best state.

BRIEF DESCRIPTION OF THE DRAWINGS

In order to more clearly illustrate the embodiments of the present disclosure or the technical solutions in the prior art, the following briefly introduces the accompanying drawings that need to be used in the description of the embodiments or the prior art. Obviously, the drawings in the following description are only some embodiments of the present disclosure. For those of ordinary skill in the art, other drawings can also be obtained based on the structures shown in these drawings without any creative effort.

Description of reference signs shown in the figures is provided in the following table.

| reference sign | name |
| --- | --- |
| 1 | compressor |
| 10 | motor |
| 20 | housing |
| 100 | stator |
| 100a | central hole |
| 100b | stator slot |
| 110 | stator core |
| 111 | trimming portion |
| 120 | stator winding |
| 200 | rotor |
| 200a | rotor slot |
| 210 | rotor core |
| 220 | magnet |

The realization of the objective, functional characteristics, and advantages of the present disclosure are further described with reference to the accompanying drawings.

DETAILED DESCRIPTION OF EMBODIMENTS

The technical solutions of the embodiments of the present disclosure will be described in more detail below with reference to the accompanying drawings. It is obvious that the embodiments to be described are only some rather than all of the embodiments of the present disclosure. All other embodiments obtained by persons skilled in the art based on the embodiments of the present disclosure without creative efforts shall fall within the scope of the present disclosure.

It should be noted that if there is a directional indication (such as up, down, left, right, front, rear . . . ) in the embodiments of the present disclosure, the directional indication is only used to explain the relative positional relationship, movement, etc. of the components in a certain posture (as shown in the drawings). If the specific posture changes, the directional indication will change accordingly.

In addition, the descriptions associated with, e.g., "first" and "second," in the present disclosure are merely for descriptive purposes, and cannot be understood as indicating or suggesting relative importance or impliedly indicating the number of the indicated technical feature. Therefore, the feature associated with "first" or "second" can expressly or impliedly include at least one such feature. Besides, the meaning of "and/or" appearing in the disclosure includes three parallel scenarios. For example, "A and/or B" includes only A, or only B, or both A and B. In addition, the technical solutions between the various embodiments can be combined with each other, but they must be based on the realization of those of ordinary skill in the art. When the combination of technical solutions is contradictory or cannot be achieved, it should be considered that such a combination of technical solutions does not exist, nor is it within the scope of the present disclosure.

The present disclosure provides a motor, a compressor and a refrigeration device.

Figure 1:
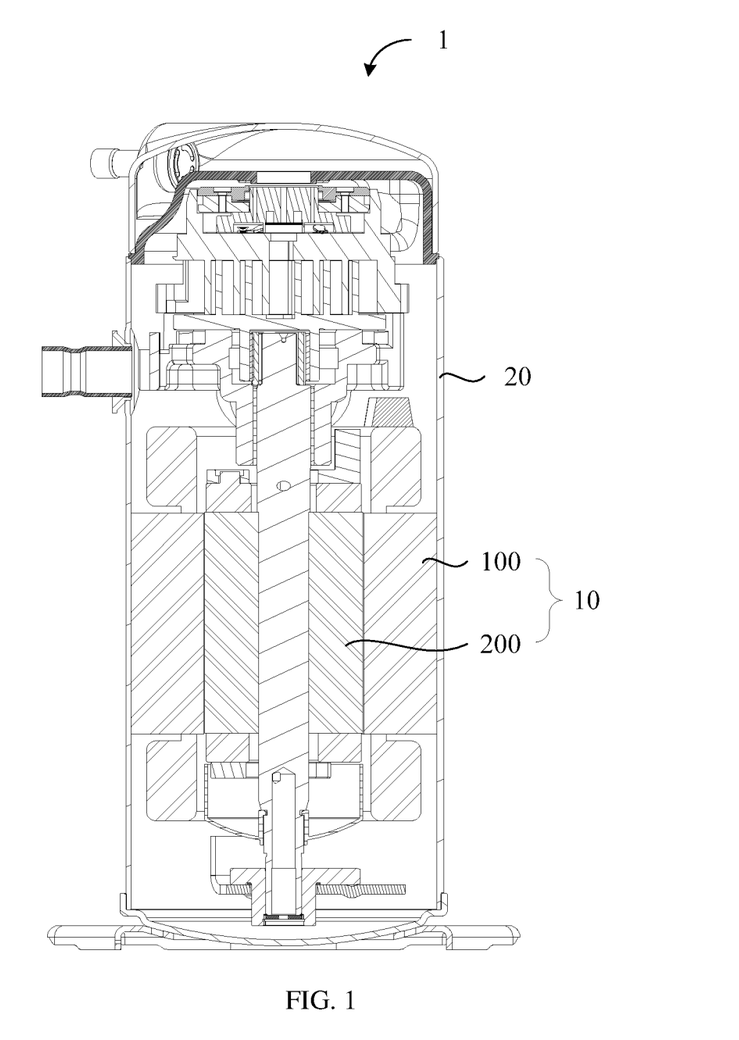
FIG. 1 is a schematic structural view of a compressor according to an embodiment of the present disclosure.
Figure 2:
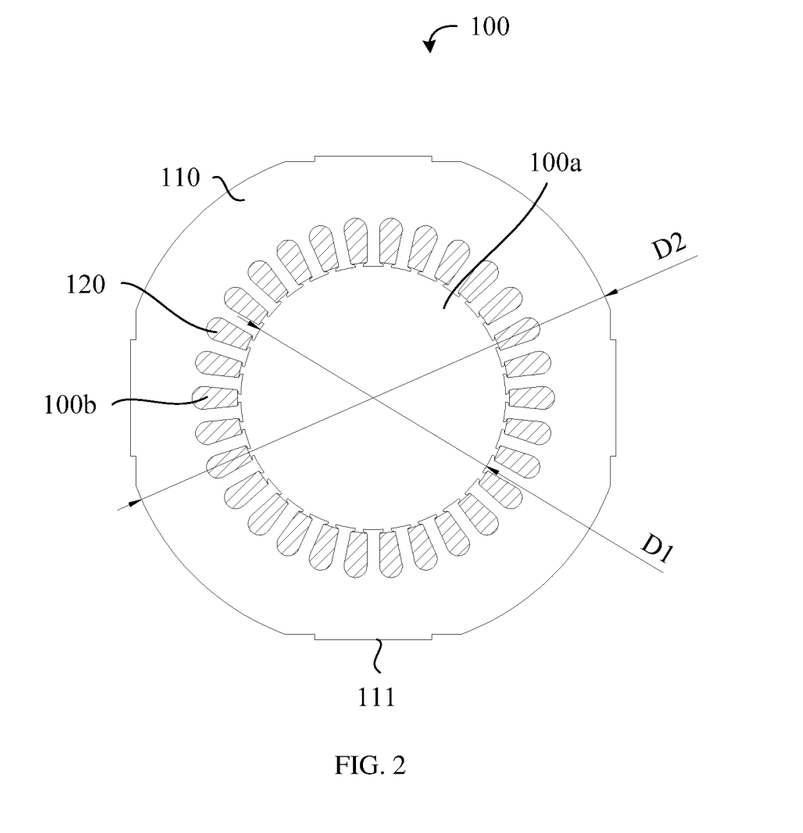
FIG. 2 is a schematic structural view of a stator according to an embodiment of the present disclosure.
Figure 3:
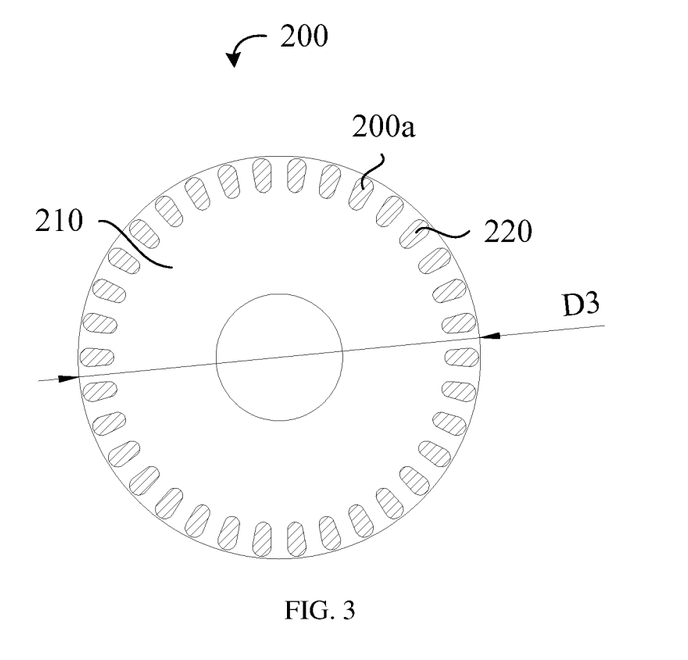
FIG. 3 is a schematic structural view of a rotor according to an embodiment of the present disclosure.

In an embodiment of the present disclosure, as shown in FIG. 1 to FIG. 3, the motor 10 includes a stator 100 and a rotor 200. The stator 100 has a central hole 100a and a plurality of stator slots 100b, and the stator slots 100b are arranged in an annular array centered on an axis of the central hole 100a. The rotor 200 is provided in the central hole 100a, a plurality of rotor slots 200a are provided on the rotor 200. The rotor slots 200a are arranged in an annular array centered on the axis of the central hole 100a, and are close to an edge of the rotor. As shown in FIG. 2 to FIG. 3, a plane perpendicular to the axis of the central hole 100a is defined as a reference plane. A sum of projected areas of the stator slots 100b on the reference plane is S1, a sum of projected areas of the rotor slots 200a on the reference plane is S2, an outer periphery of the stator 100 is projected on the reference plane to form a projected pattern, and an area of the projected pattern is S3, where S2/S1 is not less than 0.26 and not greater than 0.33, S1/S3 is not less than 0.10 and not greater than 0.18. It has been discovered through experiments that, by providing the stator slots, the rotor slots and the stator with the above ranges of dimensions and/or relationship, the distribution of iron loss and copper loss of the motor can be unexpectedly improved. Consequently, the overall performance and efficiency of the motor can be improved and the relationship between the starting torque of the motor and the motor efficiency can be balanced.

The stator 100 can include a stator core 110 and a stator winding 120, and the stator winding 120 is wound on the stator core 110. As shown in FIG. 1 to FIG. 2, the stator core 110 can include a plurality of stator punching sheets which are stacked and punched. The stator punching sheet can be a silicon steel sheet, which can reduce eddy current loss and hysteresis loss, thereby reducing the heating of the core, and multiple silicon steel sheets are insulated from each other, which can reduce the overcurrent area and further reduce the heating of the stator 100.

As shown in FIG. 2, the stator punching sheet is provided with a central hole unit and a plurality of stator slot units. The plurality of stator slot units on each stator punch sheet pass through along the axial direction of the stator core 110, so that the plurality of stator slot units form the stator slots 100b for the stator windings 120 to pass through. Likewise, the center hole unit of each stator punch sheet passes through along the axial direction of the stator core 110, so that the plurality of center hole units form a central hole 100a for the rotor 200 to pass through. Referring to FIG. 2, the plurality of stator slots 100b are arranged in a circular array with the axis of the central hole 100a as the center, and the plurality of stator slots 100b can be arranged at equal intervals around the central hole 100a.

It should be noted that the stator core 110 may also be integrally arranged, and the integral arrangement process is simple, which reduces the manufacturing difficulty of the stator core 110, thereby reducing the production cost of the motor 10. In addition, since the stator core 110 is integrally arranged, the mechanical properties of the stator core 110 can be effectively improved, the stability of the motor 10 during operation and the service life of the motor 10 can be improved.

As shown in FIG. 1 and FIG. 3, the rotor 200 may include a rotor core 210 and a magnet 220. The rotor core 210 includes a plurality of rotor punching sheets, which are stacked and punched. The rotor punching sheet can also be a silicon steel sheet, thereby reducing eddy current loss and hysteresis loss and reducing the heating of the core. In addition, since the plurality of silicon steel sheets are insulated from each other, the flow area can be reduced, and the heat generation of the rotor 200 can be further reduced.

As shown in FIG. 3, the rotor punching sheet is provided with a rotor slot unit. When multiple rotor punching sheets are punching, the rotor slot unit of each rotor punching sheet passes through along the axial direction of the rotor core 210, so that the plurality of rotor slot units form the above-mentioned rotor slot 200a, into which the magnet 220 is inserted. It can be understood that the magnet 220 may be a permanent magnet 220, and the permanent magnet 220 is made of rare earth permanent magnet material, such as NdFeB. The magnetic force of NdFeB is stronger, which can further improve the performance of the motor 10 and the running power of the motor 10. Referring to FIG. 3, a plurality of rotor slots 200a are arranged in an annular array around the periphery of the rotor punching sheet with the axis of the central hole 100a as the center. It can be understood that the plurality of rotor slots 200a may be arranged at equal intervals.

The reference plane is a plane perpendicular to the central hole 100a, and can also be considered as a radial section of the stator 100 or the rotor 200. As shown in FIG. 2, S1 is the sum of the projections of the plurality of stator slots 100b in the vertical direction. The stator winding 120 is wound on the stator core 110 and accommodated in the stator slot 100b. If the sum S1 of the projections of the plurality of stator slots 100b in the vertical direction is overly large, causing the magnetic circuit to saturate easily, the operating current will be overly large, and the copper loss and the iron loss of the stator 100 will increase. However, if the sum S1 of the projections of the plurality of stator slots 100b in the vertical direction is too small, the resistance will increase, and the copper loss and iron loss of the stator 100 will also increase. Therefore, S1 cannot be overly large, nor overly small.

As shown in FIG. 3, S2 is the sum of the projections of the plurality of rotor slots 200a in the vertical direction, and the magnets 220 are inserted in the rotor slots 200a. If the sum S2 of the projections of the plurality of rotor slots 200a in the vertical direction is increased, the starting torque of the motor 10 is reduced, and the efficiency of the motor 10 is increased. However, the magnet 220 is also increased accordingly, thereby increasing the iron loss of the rotor 200. In order to reduce the iron loss of the rotor 200, the volume of the magnet 220 is reduced, and the sum S2 of the projections of the plurality of rotor slots 200a in the vertical direction is reduced, which will increase the starting torque of the motor 10 and reduce the efficiency of the motor 10.

Since the size of the rotor 200 is related to the stator 100, the ratio of S2 to S1 is not less than 0.26 and not greater than 0.33, thereby reasonably improving the distribution of iron loss and copper loss of the motor 10, and ensuring that the motor 10 has sufficient starting torque. Therefore, the efficiency of the motor 10 is improved, and the relationship between the distribution of copper loss and iron loss of the motor 10 and the starting torque of the motor 10 is effectively balanced.

As shown in FIG. 2, S3 is the cross-sectional area of the stator punching sheet, that is, S3 includes the area of S1. In order to further improve the working efficiency of the motor 10, the ratio of the sum S1 of the projections of the plurality of stator slots 100b in the vertical direction to the cross-sectional area S3 of the stator punching sheet is not less than 0.10 and not greater than 0.18, and the structure of the stator 100 is optimized.

In technical solutions of the present disclosure, the sum S1 of the projected area of the stator slot 100b on the reference plane ensures that the stator winding 120 located in the stator slot 100b can provide an effective armature magnetic field, thereby reducing the copper loss of the stator winding 120. In addition, by defining the sum S2 of the projected area of the rotor slot 200a on the reference plane, the area of the rotor slot 200a is reduced, and the iron loss of the rotor 200 is reduced. The ratio of S2 to S1 is not less than 0.26 and not greater than 0.33, which effectively improves the distribution of iron loss and copper loss of the motor 10, improves the overall performance and efficiency of the motor 10, and balances the relationship between the starting torque of the motor 10 and the efficiency of the motor 10.

Further, in order to improve the distribution of iron loss and copper loss of the motor 10, ensure that the stator winding 120 can provide an effective armature magnetic field, the magnetic flux of the motor 10 is limited, the ratio of the projected area S3 of the outer periphery of the stator 100 projected on the reference plane to the sum S1 of the projected area of the stator slot 100b on the reference plane is not less than 0.10 and not greater than 0.18, so that the efficiency of the motor 10 is further improved.

Figure 4:
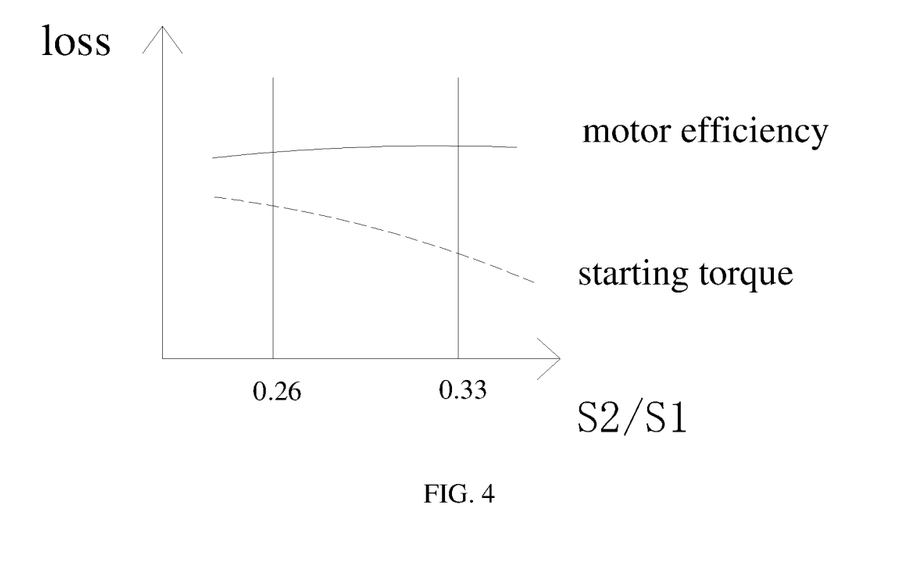
FIG. 4 is a schematic diagram of a loss of motor efficiency and starting torque of the present disclosure as S2/S1 changes.

Further, S2/S1 is not less than 0.27 and not greater than 0.31. As shown in FIG. 4, as the ratio of S2 to S1 increases, the loss of the efficiency of the motor 10 increases slightly, and the loss of the starting torque of the motor 10 is smaller. In order to reduce the efficiency of the motor 10 and the loss of the dynamic torque of the motor 10, the ratio of S2 to S1 is greater than or equal to 0.27 and less than or equal to 0.31.

Figure 5:
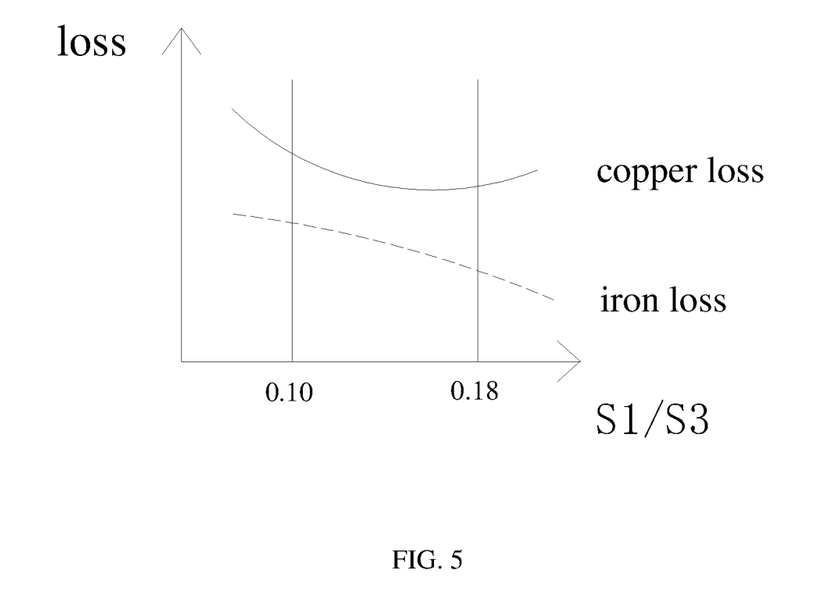
FIG. 5 is a schematic diagram showing a variation of S1/S3 and copper loss and iron loss of the present disclosure.

In an embodiment, S1/S3 is not less than 0.12 and not greater than 0.16. As shown in FIG. 5, if the ratio of S1 to S3 is overly small or overly large, the copper loss of the motor 10 will increase. The larger the ratio of S1 to S3, the lower the iron loss of the motor 10. In order to consider the copper loss and iron loss of the motor 10, the ratio of S1 to S3 is greater than or equal to 0.12 and less than or equal to 0.16.

In another embodiment, S2/S1 is not less than 0.27 and not greater than 0.31, and S1/S3 is not less than 0.12 and not greater than 0.16. Therefore, the efficiency of the motor 10 and the loss of the dynamic torque of the motor 10 are reduced, and the copper loss and iron loss of the motor 10 are reduced, and the relationship between the starting torque of the motor 10 and the efficiency of the motor 10 is balanced.

As shown in FIG. 4 and FIG. 5, in an embodiment, when S2/S1 is equal to 0.285, the loss of the starting torque of the motor 10 is not too high, and the loss of the efficiency of the motor 10 is small. When S1/S3 is equal to 0.135, the copper loss of the motor 10 is the smallest, and the iron loss of the motor 10 is relatively small.

In order to improve the efficiency of the motor 10, as shown in FIG. 2, in an embodiment, the diameter of the central hole 100a is D1, and the outer diameter of the stator 100 is D2, D1/D2 is not less than 0.51 and not greater than 0.53.

By limiting the ratio of the diameter D1 of the central hole 100a to the outer diameter D2 of the stator 100, the width of the yokes of the stator 100 and the rotor 200 can be effectively guaranteed, the magnetic field distribution of the motor 10 can be improved, and the iron loss of the stator 100, the copper loss of the rotor 200, and the aluminum loss of the rotor 200 can be effectively reduced. In addition, the sizes of the stator core 110 and the rotor core 210 are also limited, and the magnetic flux of the motor 10 is further limited, thereby improving the efficiency of the motor 10.

The diameter D1 of the central hole 100a cannot be overly small, referring to FIG. 2, in one embodiment, the diameter D1 is not less than 150 mm By limiting the size of the central hole 100a, the size of the rotor core 210 is limited, thereby effectively ensuring the efficiency of the motor 10.

In order to further reduce the copper loss of the motor 10, referring to FIG. 3, in an embodiment, the outer diameter of the rotor 200 is D3, (D1−D3)/2 is not greater than 0.50 mm By optimizing the gap between the stator 100 and the rotor 200 of the motor 10, the excitation current of the stator winding 120 can be effectively reduced, thereby reducing the copper loss of the stator winding 120.

After the area sum S1 of the plurality of stator slots 100b and the area sum S2 of the plurality of rotor slots 200a are limited, as shown in FIG. 2 to FIG. 3, in an embodiment, a number of the stator slots 100b is a multiple of 6, and a number of the rotor slots 200a is a multiple of 2. Thus, the copper loss and iron loss of the motor 10 during operation are further reduced, the efficiency of the motor 10 is improved, and the relationship between the starting torque of the motor 10 and the efficiency of the motor 10 is balanced. It can be understood that the arrangement of the rotor slots 200a in pairs can optimize the magnetic field distribution of the rotor 200 and improve the efficiency of the motor 10.

In an embodiment, the number of the stator slots 100b is 30, and the number of the rotor slots 200a is 34. After limiting the ratio of S1 and S2, the number of stator slots 100b is 30, thereby limiting the area of a single stator slot 100b, ensuring that the stator winding 120 provides an effective armature magnetic field, and further reducing the copper loss of the stator winding 120. Likewise, the number of rotor slots 200a is 34, thereby limiting the area of a single rotor slot 200a, and ensuring the starting torque of the motor 10.

In order to facilitate oil return when applied to the compressor 1, as shown in FIG. 1 to FIG. 2, in an embodiment, the periphery of the stator 100 has a trimming portion 111 that is trimmed. When stator punching sheets are used, each stator punching sheet can be pre-trimmed, and subsequently stacked together, so that the peripheral edge of the stator forms the trimming portion 111. When the stator 100 is matched with the housing 20 of the compressor 1, an oil return gap is formed between the trimming portion 111 and the housing 20. Therefore, during the operation of the compressor 1, the lubricating oil carried by the refrigerant can be returned to the oil storage structure from the oil return gap.

The lubricating oil can flow back from the oil return gap, or can flow out from the oil return gap, in order to avoid the lubricating oil flowing out overly fast. As shown in FIG. 2, in an embodiment, the number of the trimming portions 111 is not less than four, and a plurality of the trimming portions 111 are arranged along the circumferential direction of the stator 100.

The number of the trimming portions 111 is greater than or equal to 4, which improves the flow area of the motor 10, thereby reducing the oil running speed, reducing the oil output, ensuring the lubrication of the mechanical parts, and improving the overall performance of the motor 10.

As shown in FIG. 1, the present disclosure further provides a compressor 1. The compressor 1 includes a housing 20 and a motor 10, and the motor 10 is mounted on the housing 20. The structure of the motor 10 can be referred to in the above-mentioned embodiments. Since the compressor 1 adopts all the technical solutions of the above-mentioned embodiments, it has at least all the beneficial effects brought about by the technical solutions of the above-mentioned embodiments, which will not be repeated herein. It can be understood that the housing 20 may be provided with an accommodating cavity, and the motor 10 is installed in the accommodating cavity.

The present disclosure further provides a refrigeration device, the refrigeration device includes a compressor 1, and the compressor 1 includes the above-mentioned motor 10. The refrigeration device further includes a motor 10 and a fan, and the motor 10 is electrically connected to the fan to drive the fan to operate. The structure of the compressor 1 can be referred to in the above-mentioned embodiments. Since the refrigeration device adopts all the technical solutions of the above-mentioned embodiments, it has at least all the beneficial effects brought by the technical solutions of the above-mentioned embodiments, which will not be repeated here.

The refrigeration device can be an air conditioner, a refrigerator, a fan, or the like, and the compressor 1 can also be applied to a television, a washing machine, a dishwasher, an air conditioner purifier, or the like.

The above are only some embodiments of the present disclosure, and do not limit the scope of the present disclosure thereto. Under the inventive concept of the present disclosure, equivalent structural transformations made according to the description and drawings of the present disclosure, or direct/indirect application in other related technical fields are included in the scope of the present disclosure.

What is claimed is:

1. A motor comprising:
a stator; and
a rotor,
wherein:
the stator has a central hole and a plurality of stator slots, wherein the stator slots are arranged in an annular array centered on an axis of the central hole;
the rotor is provided in the central hole, wherein a plurality of rotor slots are provided on the rotor;
the rotor slots are arranged in an annular array centered on the axis of the central hole, and are close to an edge of the rotor; and
a plane perpendicular to the axis of the central hole is a reference plane, wherein a sum of projected areas of the stator slots on the reference plane is S1, wherein a sum of projected areas of the rotor slots on the reference plane is S2, wherein an outer periphery of the stator projected on the reference plane forms a projected pattern, wherein an area of the projected pattern is S3, wherein S2/S1 is not less than 0.26 and not greater than 0.33, and wherein S1/S3 is not less than 0.10 and not greater than 0.18.

2. The motor of claim 1, wherein S2/S1 is not less than 0.27 and not greater than 0.31.

3. The motor of claim 2, wherein the S2/S1 is equal to 0.285.

4. The motor of claim 1, wherein S1/S3 is not less than 0.12 and not greater than 0.16.

5. The motor of claim 4, wherein the S1/S3 is equal to 0.135.

6. The motor of claim 1, wherein:
a diameter of the central hole is D1 and an outer diameter of the stator is D2, and
D1/D2 is not less than 0.51 and not greater than 0.53.

7. The motor of claim 6, wherein:
an outer diameter of the rotor is D3, and
(D1−D3)/2 is not greater than 0.50 mm.

8. The motor of claim 1, wherein:
a number of the stator slots is a multiple of 6, and
a number of the rotor slots is a multiple of 2.

9. The motor of claim 8, wherein:
the number of the stator slots is 30, and
the number of the rotor slots is 34.

10. The motor of claim 1, wherein a periphery of the stator has at least one trimming portion that is trimmed.

11. The motor of claim 10, wherein:
the least one trimming portion comprises a plurality of trimming portions arranged along a circumferential direction of the stator, and
the number of the plurality of trimming portions is not less than four.

12. A compressor comprising a housing and the motor of claim 1, the motor being installed in the housing.

13. A refrigeration device comprising the compressor of claim 12.

14. A refrigeration device comprising the motor of claim 1.

* * * * *